Patented Jan. 19, 1937

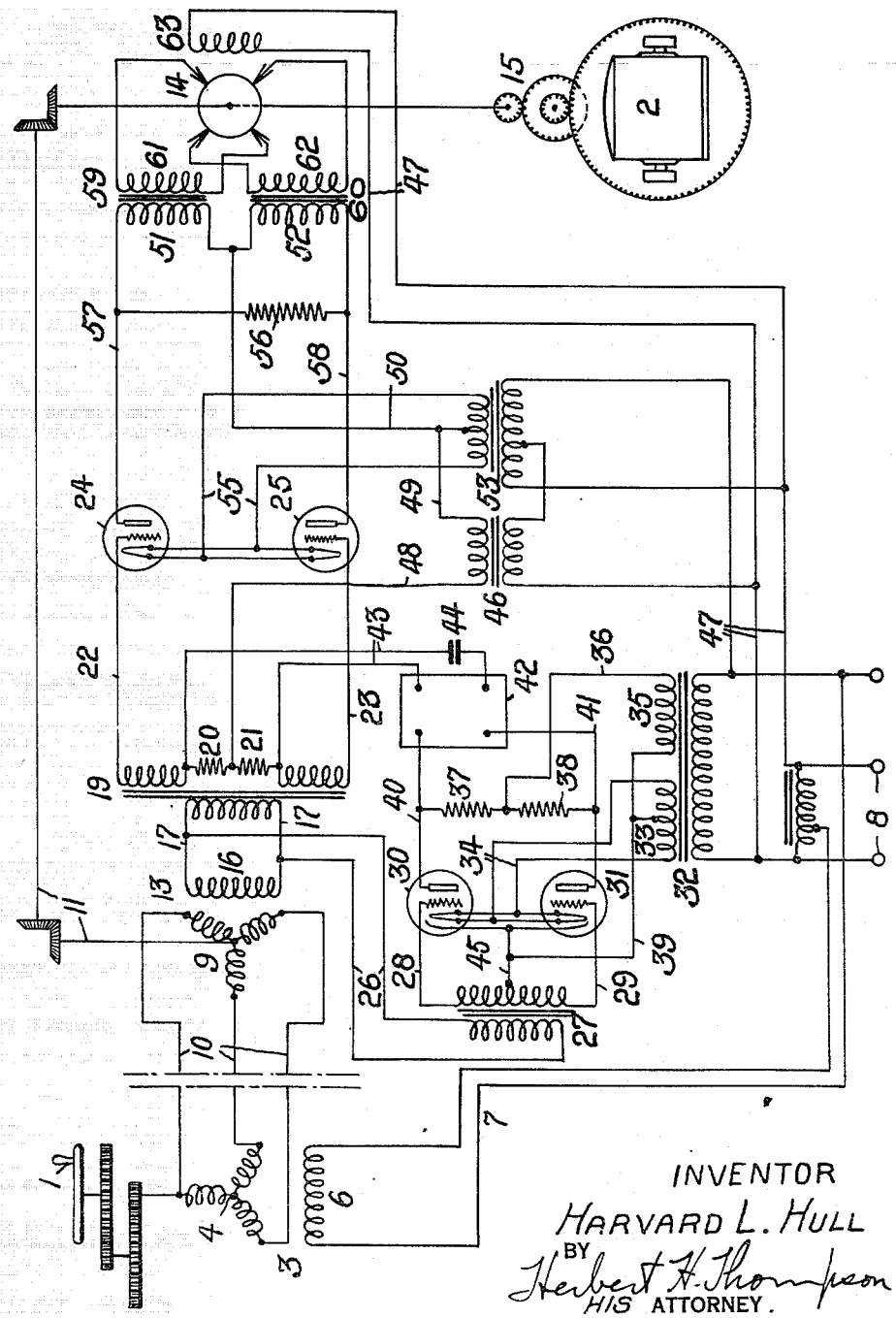

2,068,490

UNITED STATES PATENT OFFICE 2,068,490

POSITION CONTROL SYSTEM

Harvard L. Hull, Leonia, N. J., assignor to Sperry Gyroscope Company, Inc., Brooklyn, N. Y., a corporation of New York Application April 5, 1935, Serial No. 14,776

9 Claims. (Cl. 172—239)

This invention relates, generally, to electrical control systems, and the invention has reference, more particularly, to a novel improved continuously operable electrical position control system wherein a controlling object is arranged to operate through suitable electrically operable means to cause the controlled object to move in substantial synchronism with the controlling object, both as to position and velocity.

In my copending application Serial No. 6,917, I disclosed and claimed a continuously operable position control system wherein the motive means for controlling the motion of the controlled object is operated not only in response to the relative angular displacement of the controlling object with respect to the controlled object, but also in response to the relative acceleration (positive or negative) of the controlling object with respect to the controlled object, i. e., to the second time derivative of relative angular displacement of the objects.

The principal object of the present invention is to improve upon my prior system by providing a novel position control system wherein the motive means for controlling the motion of the controlled object is operated not only in response to the relative angular displacement of the controlling object with respect to the controlled object, and possibly also the acceleration thereof, but also in response to the relative velocity of the controlling object with respect to the controlled object, i. e., to the first time derivative of the relative angular displacement of the objects.

Another object of the present invention lies in the provision of a control system of the above character having means for amplifying the relative angular displacement signal voltage received from the controlling object means, together with electron tube means for detecting the phase of the displacement signal voltage and for amplifying and rectifying such signal voltage to produce a D. C. pulsating voltage, the magnitude of which depends on the relative displacement of the controlling object with respect to the controlled object, and the direction of which depends on the direction of relative displacement of the controlling object with respect to the controlled object; said D. C. pulsating voltage being filtered and then applied to an impedance designed so that a surge potential proportional to the rate of change of said D. C. voltage is produced, such derived D. C. surge potential corresponding to the first time derivative of the displacement voltage, i. e., to the relative velocity of the controlling object with respect to the controlled object; the said derived D. C. potential being passed along with the amplified A. C. displacement potential onto the grids of grid controlled rectifier tube means that control the power motive means actuating the controlled object, whereby the torque applied to the controlled object is responsive to the relative displacement and velocity of the controlling object with respect to the controlled object.

Other objects and advantages will become apparent from the specification, taken in connection with the accompanying drawing wherein the single figure is a wiring diagram illustrating an embodiment of the novel position control system of this invention.

Referring now to the said drawing, the controlling object 1 is illustrated as a handwheel, although the same might be any small power turnable object, such as a telescope, the angular motion of which is to be accurately and immediately repeated by the searchlight 2, or other controlled object, through the operation of the novel position control system of this invention. A transmitter 3 of a well known type has its stator winding 6 excited with alternating current by leads 7 connected to a suitable source of alternating voltage, represented by three-phase supply leads 8. The rotor 4 of transmitter 3 is in inductive relation to stator 6 and is connected by leads 10 to the rotor 9 of a receiver 13. Rotor 9 is mechanically connected by suitable transmission means 11 to the rotor of a power motor 14, which is illustrated as a repulsion motor, although any suitable type of motor, such as a series motor, may be used, said motor serving to drive the searchlight 2 through reduction gearing 15.

As is well known to those skilled in the art, the winding 6 induces in rotor 4 an alternating magnetic field having a position in space determined by the relative position of winding 4 with respect to winding 6. Any rotation of the rotor 4 caused by angular movement of handwheel 1 produces a corresponding angular shifting of the axis of the magnetic field in rotor 9, whereby the pulsating field of rotor 9 is caused to induce an alternating electromotive force in the receiver stator winding 16, the value of which is substantially proportional to the angle of displacement between the handwheel 1 and searchlight 2.

The terminals of stator 16 are connected by leads 17 to the primary winding of a transformer 19 having a divided secondary winding, the two halves of which are interconnected by resistors 20 and 21, arranged in series. The terminals of the secondary winding of transformer 19 are connected by leads 22 and 23 to the grids of the gaseous or vapor containing grid controlled rectifier tubes 24 and 25. Thus the alternating displacement signal from receiver 13 is amplified by transformer 19 and is applied directly to the grids of the tubes 24, 25 in 180° out-of-phase relation.

Leads 26, connected to leads 17, serve to apply the alternating displacement signal voltage to the primary winding of a transformer 27, whose secondary winding has its terminals respectively connected by leads 28 and 29 to the grids of thermionic tubes 30 and 31, so that the transformer amplified displacement signal potential is applied to the grids of tubes 30 and 31 in 180° out-of-phase relation. Tubes 30 and 31 serve as phase detecting tubes in detecting the phase of the displacement signal voltage corresponding to the relative direction of rotation of the handwheel 1, and also amplify the displacement signal voltage.

A transformer 32, connected across two of the leads 8, supplies filament current to tubes 30 and 31 from its secondary 33, through leads 34, and supplies alternating voltage from another secondary 35 to the anodes of these tubes through lead 36, connected to the point of connection of two series connected similar resistors 37 and 38 that are respectively connected to the anode leads 40 and 41 of tubes 30 and 31. The other terminal of secondary 35 is connected by leads 39 and 45 to the mid point of the secondary winding of transformer 27 and to the cathodes of tubes 30 and 31.

When a displacement signal potential is being amplified by the tubes 30 and 31, the currents flowing in the two resistors 37 and 38 will be unequal because of the phase relations between the A. C. plate supply to tubes 30 and 31 and the A. C. signal potential applied to the grids thereof, i. e., when the signal potential is of one phase, the plate circuit of one tube will carry a much larger current than that of the other, and vice versa. Thus a pulsating D. C. voltage appears across leads 40 and 41, the magnitude of which depends on the relative displacement of the objects, and the direction of which depends on the direction of such relative displacement.

This D. C. pulsating voltage is conducted by leads 40 and 41 to a filter 42, which smooths out the ripples therein. Leads 43 are connected to filter 42 and to the outer terminals of resistors 20 and 21, and one of these leads has a condenser 44 therein, whereby, if the D. C. displacement voltage across the filter output is changing, corresponding to a change in the relative displacement in the objects, then the time rate of change, or the first derivative voltage thereof with respect to time, i. e., a voltage proportional to $$\frac{d\theta}{dt}$$

will appear across resistors 20 and 21 and is additive to the A. C. displacement signal voltage supplied from transformer 19, so that both the A. C. signal and D. C. surge potentials pass through leads 22 and 23 to the grids of tubes 24 and 25.

As is well known to persons skilled in the art, the average value of the current flowing in the anode circuits of the grid controlled rectifier tubes 24 and 25 can be varied by varying the phase relationship between the voltages applied to the grids and the anodes, respectively. Alternating voltage is supplied to the grids of tubes 24 and 25 in in-phase relation with respect to one another by means of a transformer 46, supplied from the A. C. leads 8, through leads 47 and a portion of the primary of a filament supply transformer 53. One end of the secondary of transformer 46 is connected by lead 48, through resistors 20 and 21 and the secondary of transformer 19, to the grids of tubes 24 and 25. The other end of the secondary of transformer 46 is connected by leads 49 and 50 to the windings 51 and 52 of motor control transformers 59 and 60. Lead 50 also connects with the mid tap of the secondary of the filament supply transformer 53 having its primary supplied from leads 47, connected to leads 8. The secondary of transformer 53 supplies filament current to tubes 24 and 25 through leads 55. A resistance 56 connected across the anode leads 57 and 58 of tubes 24 and 25, serves to improve the operation of these tubes, as disclosed and claimed in the copending application of Francis L. Moseley, Serial No. 733,611.

One pair of brushes of the repulsion motor 14 is connected across the winding 61 of transformer 59, whereas the other pair of brushes of this motor is connected across the winding 62 of transformer 60. The field winding 63 of motor 14 is supplied with A. C. by leads 47, so that an alternating potential is induced in the rotor of this motor, and therefore potentials appear across the brushes of this motor which are applied to the transformer windings 61 and 62. Hence, when the tube 24 is rendered conducting, the winding 61 of transformer 59 is shorted, in effect, and motor 14 operates in one direction, whereas when the tube 25 is rendered conducting, the winding 62 of transformer 60 is shorted, in effect, and motor 14 operates in the opposite direction, the speed of operation of the motor depending upon the magnitude of current flowing in the output circuit. The phase of the biasing voltage supplied to the grids of tubes 24 and 25 is so adjusted that in the absence of a signal potential or voltage, only a small standby current flows in the output circuits of tubes 24 and 25.

As long as the controlling object 1 is not displaced with respect to the controlled object 2, no signal voltage is applied to the grids of the grid controlled rectifier tubes 24 and 25, but as soon as the handwheel 1 starts to turn with respect to the searchlight 2, the amplified alternating displacement signal potential from transformer 19 and the D. C. surge potential, dependent on the first time rate of change of displacement, i. e., velocity, are impressed on the grids of tubes 24 and 25 in 180° out-of-phase relation, so that the resultant of such potentials is additive to the A. C. bias supplied from the transformer 46 at the grid of one of these tubes, thereby shifting the phase of the resultant voltage supplied to the grid of this tube and causing current to flow in the output circuit of this tube, resulting in the rotation of power motor 14 in the direction necessary to synchronize the controlling and controlled objects. Motor 14 also acts through the follow-up transmission means 11 to move rotor 9 into synchronism with rotor 4.

The phase and magnitude of the combined signal which depends upon the D. C. derivative potential of the A. C. displacement potential determines the torque and speed of motor 14. During acceleration of the handwheel 1, the A. C. displacement signal potential is increased by the D. C. first derivative signal potential to give added torque to the motor 14. Thus the first derivative signal potential aids the displacement potential in controlling the action of motor 14 so that substantial synchronism of the controlling and controlled objects is obtained.

Although the control system of this invention is described in connection with a continuously operable position control system, it is to be understood that the invention is not limited thereto, but is equally applicable to other servo mechanisms, such as temperature or production control systems, and hence the expression "signal potential" is used in the following claims to include control potentials supplied by various sources, such as those given off by thermocouples, photo-electric cells, the sensitive element of follow-up systems, etc. Also it is obvious that my system may be used to control any suitable type of electric motor, such as a series motor, in lieu of a repulsion motor.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A position control system of the character described, comprising a controlling object, a controlled object, motive means for driving said controlled object, a control circuit for said motive means, said control circuit having grid controlled rectifier means therein, and means for applying A. C. and D. C. control potentials to said grid controlled rectifier means, said A. C. and D. C. control potentials being respectively responsive to the relative displacement of said objects and to the first derivative thereof with respect to time, whereby said control circuit is rendered responsive to a function of the relative displacement of said objects and to a function of the relative velocity thereof for varying the operation of said driving means.

2. A position control system of the character described, comprising a controlling object, a controlled object, motive means for driving said controlled object, a control circuit for said motive means, said control circuit having grid controlled rectifier means therein, transformer means for applying an A. C. control potential, responsive to a function of the relative displacement of said objects, to said grid controlled rectifier means, and thermionic amplifying and rectifying means for applying a D. C. control potential, responsive to a function of the relative velocity of said objects, to said grid controlled rectifier means.

3. A position control system of the character described, comprising a controlling object, a controlled object, motive means for driving said controlled object, a control circuit for said motive means, said control circuit having grid controlled rectifier means therein, transformer means for applying an A. C. control potential, responsive to a function of the relative displacement of said objects, to said grid controlled rectifier means, thermionic tube amplifying and rectifying means for producing a D. C surge potential responsive to the relative displacement of said objects, and impedance means, responsive to the time rate of change of said D. C. surge potential, for applying a derived D. C. control potential to said grid controlled rectifier means.

4. A position control system of the character described, comprising a controlling object, a controlled object, motive means for driving said controlled object, a control circuit for said motive means, said control circuit having grid controlled rectifier means therein, transformer means for applying an A. C. control potential, responsive to a function of the relative displacement of said objects, to said grid controlled rectifier means, thermionic tube amplifying and rectifying means for producing a D. C. surge potential responsive to the relative displacement of said objects, a filter for smoothing out said D. C. surge potential, and a condensive reactance, responsive to the time rate of change of said filtered D. C. surge potential, for applying a D. C. potential, responsive to a function of the relative velocity of said objects, to said grid controlled rectifier means for acting in conjunction with said A. C. control potential in controlling said grid controlled rectifier means.

5. A position control system of the character described, wherein a synchronizing force is exerted between a plurality of objects arranged to operate in synchronism and wherein a change in the electrical characteristics of said system is produced by departure of one of said objects from synchronism, comprising motive means operable for restoring synchronism between said objects, grid controlled rectifier means for controlling the operating energy supplied to said motive means, transformer means for amplifying said change in electrical characteristics, thermionic means for rectifying said change, and means for supplying the rectified first time derivative of said change along with the transformer amplified change to said grid controlled rectifier means for controlling the operation of the latter.

6. In a control system, in combination, a plurality of objects arranged to move in synchronism, synchronizing means interconnecting said objects, said synchronizing means comprising means for setting up an alternating signal potential responsive to the relative displacement of said objects from synchronism, motive means for restoring synchronism between said objects, grid controlled rectifier means for controlling the supply of operating energy to said motive means, means for applying an A. C. bias to said grid controlled rectifier means, a transformer for amplifying said alternating signal potential for application to said grid controlled rectifier means, thermionic tube means for receiving said alternating signal potential, impedance means cooperable with said thermionic tube means for producing a D. C. surge potential responsive to the relative displacement of said objects, and additional impedance means for receiving said D. C surge potential and for passing a potential responsive to any change thereof with respect to time onto said grid controlled rectifier means, the resultant of said A. C. bias potential, said amplified signal potential and said derived D. C. surge potential serving to control the operation of said rectifier means.

7. In a control system, power consuming means, grid controlled rectifier means for controlling the supply of operating energy to said power consuming means, means for producing an A. C. signal potential, a transformer for applying said A. C. signal potential to said rectifier means, and means for receiving said A. C. signal potential and for producing therefrom a D. C. potential responsive to the time rate of change of said A. C. signal potential for application to said rectifier means, whereby A. C. and D. C. control potentials are applied to said rectifier means.

8. In a control system, a source of A. C. supply, signal producing means energized from said supply, power consuming means, grid controlled rectifier means for controlling the supply of operating energy to said power consuming means, means for applying an A. C. biasing potential from said A. C. supply to said rectifier means, means for applying an A. C. control potential from said signal producing means to said rectifier means, and thermionic phase detecting amplifying and rectifying means supplied from said signal producing means for applying a D. C. control potential to said rectifier means.

9. In a position control system, controlling and controlled objects, a source of A. C. supply, signal prducing means energized from said supply, said signal producing means being operated in response to movements of said controlling object, power consuming means for operating said controlled object in synchronism with said controlling object, grid controlled rectifier means for controlling the supply of operating energy to said power consuming means, means for applying an A. C. biasing potential from said A. C. supply to said rectifier means and means for applying A. C. and D. C. control potentials derived from said signal producing means to said rectifier means.

HARVARD L. HULL.